United States Patent
Kim

(10) Patent No.: US 9,958,540 B2
(45) Date of Patent: May 1, 2018

(54) ULTRA-WIDEBAND TRANSCEIVER, SIGNAL TRANSMISSION AND RECEPTION METHOD THEREOF, AND ULTRA-WIDEBAND RADAR SENSOR INCLUDING THE SAME

(71) Applicant: S-1 Corporation, Seoul (KR)

(72) Inventor: Hyounkuk Kim, Gyeonggi-do (KR)

(73) Assignee: S-1 Corporation (KR)

( * ) Notice: Subject to any disclaimer, the term of this patent is extended or adjusted under 35 U.S.C. 154(b) by 370 days.

(21) Appl. No.: 14/438,669

(22) PCT Filed: Mar. 4, 2015

(86) PCT No.: PCT/KR2015/002088
§ 371 (c)(1),
(2) Date: Apr. 27, 2015

(87) PCT Pub. No.: WO2016/137044
PCT Pub. Date: Sep. 1, 2016

(65) Prior Publication Data
US 2016/0245906 A1    Aug. 25, 2016

(30) Foreign Application Priority Data
Feb. 24, 2015   (KR) .................. 10-2015-0026071

(51) Int. Cl.
*G01S 13/04* (2006.01)
*G01S 13/02* (2006.01)
(Continued)

(52) U.S. Cl.
CPC ............ *G01S 13/0209* (2013.01); *G01S 7/28* (2013.01); *G01S 13/10* (2013.01)

(58) Field of Classification Search
CPC ............................... G01S 13/0209; G01S 7/28
(Continued)

(56) References Cited

U.S. PATENT DOCUMENTS 5,361,070 A    11/1994   McEwan
7,830,989 B2 *  11/2010   Mohamadi ............. G01S 7/032
                                             343/850
(Continued)

FOREIGN PATENT DOCUMENTS

EP    1852980 A1    11/2007
JP    2002-335187 A   11/2002
(Continued)

OTHER PUBLICATIONS

International Search Report and Written Opinion for Application No. PCT/KR2015/002088 dated Dec. 4, 2015.
(Continued)

*Primary Examiner* — Marcus E Windrich
(74) *Attorney, Agent, or Firm* — Lerner, David, Littenberg, Krumholz & Mentlik, LLP

(57) ABSTRACT

An ultra-wideband transceiver includes: one antenna for transmitting a first ultra-wideband signal at time 1 and receiving a second ultra-wideband signal at time 2; a transfer unit that transfers the first ultra-wideband signal from a first node to the antenna or transfers the second ultra-wideband signal received by the antenna to the first node, based on characteristics of an input signal; and a first buffer that generates a first pulse signal for the first ultra-wideband signal and outputs the same to the first node at time 1.

18 Claims, 11 Drawing Sheets

(51) Int. Cl.
  *G01S 13/10* (2006.01)
  *G01S 7/28* (2006.01)
(58) Field of Classification Search
  USPC .......................................... 342/21, 27, 202
  See application file for complete search history.

(56) References Cited

U.S. PATENT DOCUMENTS

| | | | |
|---|---|---|---|
| 9,608,567 B2 * | 3/2017 | Egard | ...................... H03B 7/08 |
| 2005/0245210 A1 | 11/2005 | Hyunh et al. | |
| 2006/0039449 A1 * | 2/2006 | Fontana | ............. H04B 1/71635 |
| | | | 375/130 |
| 2006/0140253 A1 * | 6/2006 | Maeki | .................. H04B 1/7174 |
| | | | 375/146 |
| 2007/0072571 A1 | 3/2007 | Sun et al. | |
| 2007/0210848 A1 * | 9/2007 | Jimenez | ............... H04B 1/7174 |
| | | | 327/291 |
| 2008/0212669 A1 * | 9/2008 | Yamazaki | ................ H03K 3/64 |
| | | | 375/238 |
| 2010/0117891 A1 * | 5/2010 | Utagawa | ................... G01S 7/03 |
| | | | 342/175 |
| 2010/0315990 A1 * | 12/2010 | Utagawa | ................ H01Q 1/248 |
| | | | 370/315 |
| 2011/0058623 A1 * | 3/2011 | Segoria | .................... H03K 5/07 |
| | | | 375/295 |
| 2011/0188545 A1 | 8/2011 | An | |
| 2011/0255634 A1 * | 10/2011 | Utagawa | ................. H01Q 9/265 |
| | | | 375/295 |
| 2011/0260906 A1 * | 10/2011 | Utagawa | .................... G01S 7/03 |
| | | | 342/27 |
| 2015/0268328 A1 * | 9/2015 | Johnson | .................... G01S 7/03 |
| | | | 342/21 |
| 2016/0269075 A1 * | 9/2016 | Masson | ................ H04B 1/7174 |
| 2016/0294440 A1 * | 10/2016 | Masson | .................... H03B 5/06 |

FOREIGN PATENT DOCUMENTS

| | | |
|---|---|---|
| JP | 2008-245247 | 10/2008 |
| KR | 20040095122 A | 11/2004 |
| KR | 10-2007-0002075 A | 1/2007 |
| KR | 10-2008-0053515 A | 6/2008 |
| KR | 20090034432 A | 4/2009 |
| KR | 10-2011-0088829 | 8/2011 |

OTHER PUBLICATIONS

European Search Report for Application No. EP15713365 dated Jan. 23, 2017.

* cited by examiner

ULTRA-WIDEBAND TRANSCEIVER, SIGNAL TRANSMISSION AND RECEPTION METHOD THEREOF, AND ULTRA-WIDEBAND RADAR SENSOR INCLUDING THE SAME

CROSS-REFERENCE TO RELATED APPLICATION

This application is a national phase entry under 35 U.S.C. § 371 of International Application No. PCT/KR2015/002088, filed Mar. 4, 2015, which claims priority to Korean Patent Application No. 10-2015-0026071, filed on Feb. 24, 2015, the disclosures of which are incorporated herein by reference.

TECHNICAL FIELD

The present invention relates to an ultra-wideband transceiver that transmits and receives an ultra-wideband signal, a signal transmission and reception method for the ultra-wideband transceiver, and an ultra-wideband radar sensor including the ultra-wideband transceiver.

BACKGROUND ART

In a conventional ultra-wideband (UWB) system, a transmitter and a receiver are separate from each other. Due to this, the cost of UWB system implementation is very high. Also, very high sampling rates (e.g., GHz) are needed for the receiver to perform sampling.

In another type of conventional UWB systems, a single antenna is switched between transmit mode and receive mode by a switch to transmit and receive a signal. However, the UWB system's transmission and reception of a signal by antenna switching produces a high signal loss. Moreover, when the receiver performs sampling, it needs very high sampling rates (e.g., GHz).

DISCLOSURE

Technical Problem

The present invention has been made in an effort to provide a UWB transceiver containing a transmitter and a receiver in a single unit which has low complexity and can be implemented at a low cost.

Another aspect of the present invention is to provide a UWB transceiver that transmits and receives an impulse-radio UWB signal with a very narrow pulse width (e.g., a nanosecond (ns) pulse width).

Yet another aspect of the present invention is to provide a UWB transceiver that performs sampling at sampling rates (e.g., kHz sampling rates) at least a million times lower than the conventional ones.

A further aspect of the present invention is to provide a UWB radar sensor that includes a UWB transceiver containing a transmitter and a receiver in a single unit.

Technical Solution

An exemplary embodiment of the present invention provides an ultra-wideband transceiver. The ultra-wideband transceiver includes: one antenna for transmitting a first ultra-wideband signal at time 1 and receiving a second ultra-wideband signal at time 2; a transfer unit that transfers the first ultra-wideband signal from a first node to the antenna or transfers the second ultra-wideband signal received by the antenna to the first node, based on the characteristics of an input signal; and a first buffer that generates a first pulse signal for the first ultra-wideband signal and outputs the same to the first node at time 1.

A first input signal input into the transfer unit at time 1, which is the input signal, may be a combined signal of the first pulse signal and a first analog voltage signal.

The transfer unit may include: one transistor connected to the antenna; and a voltage distributor for distributing the voltage of the first node.

The transistor may include: a collector that is connected to a first impedance element connected to the first node and is connected to the antenna; a base that is connected to a second impedance element connected to the voltage distributor; and an emitter that is connected to a grounded third impedance element.

The ultra-wideband transceiver may further include a second buffer that generates and outputs a second pulse signal for receiving the second ultra-wideband signal at time 2.

A second input signal input into the transfer unit at time 2, which is the input signal, may be a combined signal of the second pulse signal and a second analog voltage signal, different from the first analog voltage signal.

The ultra-wideband transceiver may further include a signal generator that outputs a transmission pulse signal and a first turn-on signal for turning on the first buffer to the first buffer at time 1, and outputs a reception pulse signal and a second turn-on signal for turning on the second buffer to the second buffer at time 2.

When turned on in response to the first turn-on signal, the first buffer may generate the first pulse signal with a nanosecond (ns) pulse width by using the transmission pulse signal and the first turn-on signal.

When turned on in response to the second turn-on signal, the second buffer may generate the second pulse signal by using the reception pulse signal and the second turn-on signal.

The reception pulse signal may include a first reception pulse signal corresponding to a first scan distance and a second reception pulse signal corresponding to a second scan distance, different from the first scan distance.

The signal generator may output the first reception pulse signal after outputting the transmission pulse signal, output the transmission pulse signal after outputting the first reception pulse signal, and output the second reception pulse signal after outputting the transmission pulse signal.

The ultra-wideband transceiver may further include a digital signal processor that outputs the first analog voltage signal to the first node at time 1 and outputs the second analog voltage signal to the first node at time 2.

The second analog voltage signal may include a third analog voltage signal corresponding to the first scan distance and a fourth analog voltage signal corresponding to the second scan distance.

The ultra-wideband transceiver may further include: a capacitor that is charged by the second ultra-wideband signal and the second pulse signal at time 2; and a first converter that samples a signal in the charged capacitor at a sampling rate of kilohertz and outputs the sampled signal to the digital signal processor.

The digital signal processor may process the sampled signal and transmit a discharging signal for discharging the charged capacitor to the first converter.

The signal generator may output the transmission pulse signal again after the discharging of the capacitor and output the second reception pulse signal after outputting the transmission pulse signal.

The first pulse signal output from the first buffer at time 1 may be transferred to the first node through the first impedance element.

The second pulse signal output form the second buffer at time 2 may be transferred through a second impedance element to a second node connected to one end of the capacitor.

The second ultra-wideband signal may be transferred to the second node at time 2 through a third impedance element with one end connected to the first node and the other end connected to the second node.

The voltage distributor may include a first resistor with one end connected to the first node and the other end connected to the second impedance element, and a second resistor with one end connected to the second impedance element and the other end grounded.

The characteristics of the first ultra-wideband signal may be determined based on the impedance values of the first impedance element and third impedance element.

Another exemplary embodiment of the present invention provides a method for an ultra-wideband transceiver to transmit a first ultra-wideband signal and receive a second ultra-wideband signal. The ultra-wideband signal transmission and reception method may include: generating a first pulse signal for the first ultra-wideband signal and a first analog voltage signal; turning on one transistor into transmit mode by using a first combined signal of the first pulse signal and the first analog voltage signal; transferring the first ultra-wideband signal corresponding to the first combined signal to one antenna through the transistor turned on into transmit mode, and transmitting the first ultra-wideband signal by the antenna; generating a second pulse signal for receiving the second ultra-wideband signal and a second analog voltage signal, different from the first analog voltage signal; turning on the transistor into receive mode by using a second combined signal of the second pulse signal and the second analog voltage signal; and transferring the second ultra-wideband signal received by the antenna to a capacitor through the transistor turned on into receive mode.

Yet another exemplary embodiment of the present invention provides an ultra-wideband radar sensor that detects an object by using a second ultra-wideband signal that returns after transmitting a first ultra-wideband signal. The ultra-wideband radar sensor may include: a memory; and an ultra-wideband transceiver that is connected to the memory and transmits the first ultra-wideband signal and receives the second ultra-wideband signal.

The ultra-wideband transceiver may include: an antenna for transmitting a first ultra-wideband signal at time 1 and receiving a second ultra-wideband signal at time 2; a transfer unit that transfers the first ultra-wideband signal from a first node to the antenna or transfers the second ultra-wideband signal received by the antenna to the first node by the antenna, based on the characteristics of an input signal; and a first buffer that generates a first pulse signal for the first ultra-wideband signal and outputs the same to the first node at time 1.

A first input signal input into the transfer unit at time 1, which is the input signal, may be a combined signal of the first pulse signal and a first analog voltage signal.

Advantageous Effects

According to an embodiment of the present invention, a UWB transceiver containing a transmitter and a receiver in a single unit can be implemented at a very low cost by using a single transistor.

Moreover, the transmit mode and receive mode of a single transceiver can be controlled by controlling the voltage applied to the collector of the transceiver by a control signal, which is an analog signal.

In addition, an ultra-wideband signal can be generated using a Field Programmable Gate Array (FPGA).

Furthermore, a transmitting operation and a receiving operation can be distinguished by controlling the turn-on and turn-off timings of transmit and receive buffers.

Furthermore, discrete signals can be received depending on the scan distance by controlling the turn-on and turn-off timings of the receive buffer according to the scan distance.

Further, when discrete signals are received depending on the scan distance, signal components accumulated in a capacitor can be sampled, and the sampled signal can be digitized.

Further, sampling can be done at kilohertz sampling rates by charging the capacitor very quickly and discharging it very slowly.

MODE FOR INVENTION

Figure 1:
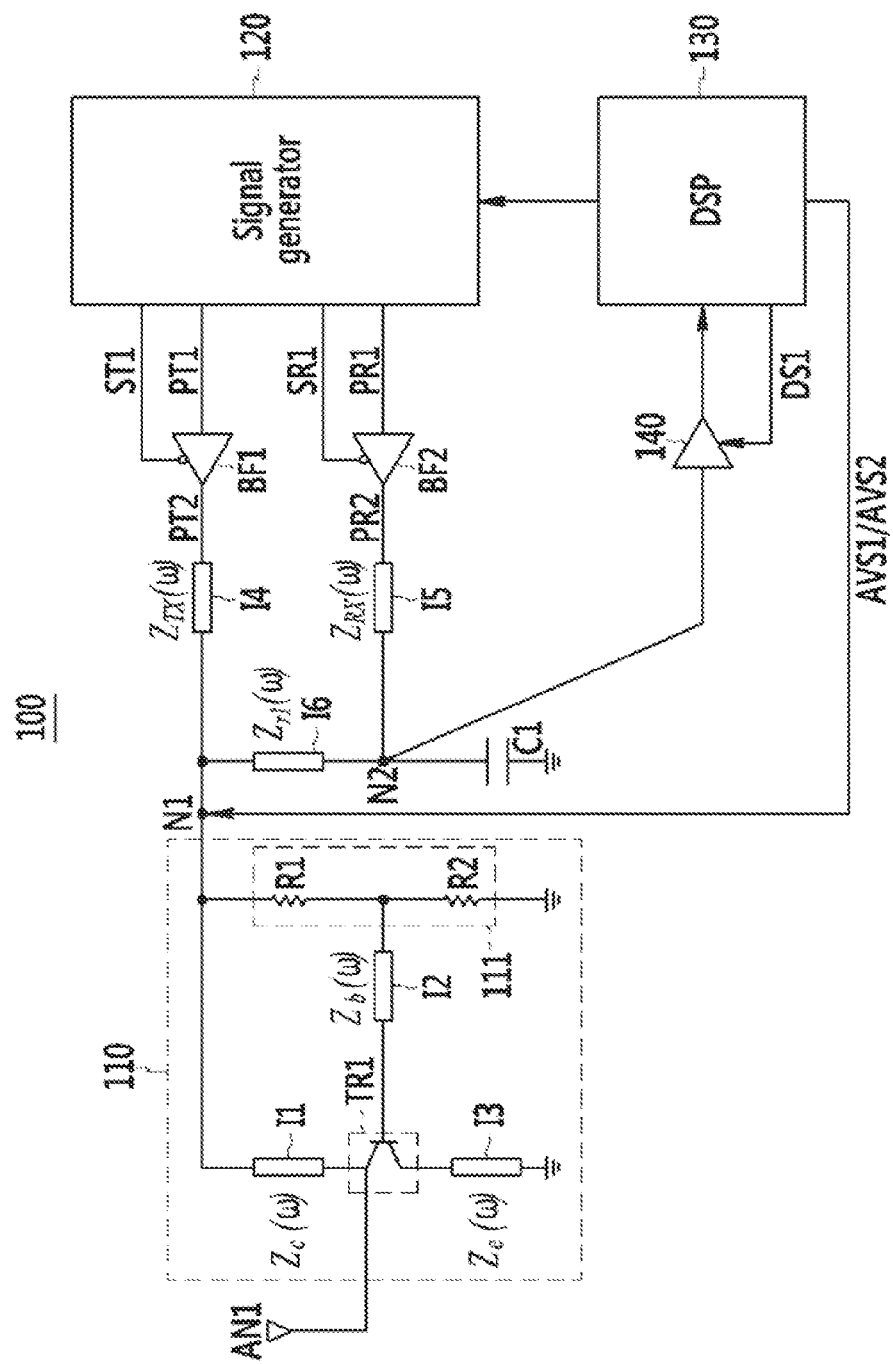
FIG. 1 is a view showing a UWB transceiver containing a transmitter and a receiver in a single unit according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a view showing a UWB transceiver 100 containing a transmitter and a receiver in a single unit according to an exemplary embodiment of the present invention. The transmitter and receiver of the UWB transceiver 100 are not separate from each other but are combined together.

Specifically, the UWB transceiver 100 includes a single antenna AN1, a transfer unit 110, a signal generator 120, a digital signal processor (DSP) 130, a transmit buffer BF1, a receive buffer BF2, an AD converter 140, a capacitor C1, and impedance elements I4 to I6.

Each of impedance elements I4 to I6 may include at least one of a resistor, an inductor, and a capacitor.

The antenna AN1 transmits or receives a UWB signal.

The transfer unit 110 transfers a UWB signal from a first node N1 to the antenna AN1 or transfers a UWB signal received by the antenna AN1 to the first node N1, based on the characteristics of a signal on the first node N1. Specifically, the transfer unit 110 may include a single transistor TR1, a voltage distributor 111, and the impedance elements I1 to I3. Each of the impedance elements I1 to I3 may include at least one of a resistor, an inductor, and a capacitor. The voltage distributor 111 distributes the voltage of the signal on the first node. The voltage distributor 111 may include a resistor R1 with one end connected to the first node R1 and the other end connected to the impedance element I2, and a resistor R2 with one end connected to the impedance element I2 and the other end grounded. The collector of the transistor TR1 is connected to the antenna AN1 and to the impedance element I1 connected to the first node N1. The base of the transistor TR1 is connected to the impedance element I2 connected to the voltage distributor 111. Specifically, the impedance element I2 is connected to the resistor R1 and the resistor R2 of the voltage distributor 111. The emitter of the transistor TR1 is connected to the grounded impedance element I3. The transistor TR1 may be turned on into transmit mode or receive mode, based on the characteristics of a signal on the first node N1. When the transistor TR1 is turned on into transmit mode, the signal on the first node N1 is transferred to the antenna AN1 through the impedance element I1, and transmitted by the antenna AN1. When the transistor TR1 is turned into receive mode, a UWB signal received by the antenna AN1 is transferred to the first node N1 through the impedance element I1.

The signal generator 120 generates a transmission pulse signal PT1 and an on-off control signal ST1 for turning on the transmit buffer BF1, and outputs them to the transmit buffer BF1. The transmission pulse signal PT1 may have a very narrow pulse width (e.g., a pulse width of several nanoseconds (ns)), and the on-off control signal ST1 may have a very narrow pulse width (e.g., pulse width of several nanoseconds (ns)). After outputting the transmission pulse signal PT1 and the on-off control signal ST1 to the transmit buffer BF1, the signal generator 120 generates a reception pulse signal PR1 and an on-off control signal SR1 for turning on the receive buffer BF2 and outputs them to the receive buffer BF2. The reception pulse signal PR1 and the on-off control signal SR1 may each have a very narrow pulse width (e.g. a pulse width of several nanoseconds (ns)). Specifically, the signal generator 120 may include a Field Programmable Gate Array (FPGA). The reception pulse signal PR1 may include N reception pulse signals PR1_1 to PR1_N corresponding to N (N is a natural number) scan distances. The on-off control signal SR1 may include N on-off control signals SR1_1 to SR1_N corresponding to N scan distances. For instance, if N is 2, the signal generator 120 may output the transmission pulse PT1 and the on-off control signal ST1 to the transmit buffer BF1 and then output the reception pulse signal PR1_1 and on-off control SR1_1 corresponding to a first scan distance (e.g., 0~1 m) to the receive buffer BF2. Also, the signal generator 120 may output the transmission pulse signal PT1 and the on-off control signal ST1 again to the transmit buffer BF1 and then output the reception pulse signal PR1_2 and on-off control signal SR1_2 corresponding to a second scan distance (e.g., 1~2 m) to the receive buffer BF2.

When turned on in response to the on-off control signal ST1, the transmit buffer BF1 generates a pulse signal PT2 by using the transmission pulse signal PT1 and the on-off control signal ST1. Specifically, the transmit buffer BF1 may generate the pulse signal PT2 by performing an AND operation on the transmission pulse signal PT1 and the on-off control signal ST1. The pulse signal PT2 is transferred to the first node N1 through the impedance element I4. When turned on in response to the on-off control signal SR1, the receive buffer BF2 generates the pulse signal PR2 by using the pulse signal PR1 and the on-off control signal SR1. Specifically, the receive buffer BF2 may generate the pulse signal PR2 by performing an AND operation on the reception pulse signal PR1 and the on-ff control signal SR1. The pulse signal PR2 is transferred to the first node N1 through the impedance element I5 and the impedance element I6. The receive buffer BF2 is turned off when the transmit buffer BF1 is turned on, and is turned on when the transmit buffer BF is turned off.

The digital signal processor 130 generates analog voltage signals AVS1 and AVS2 and outputs them to the first node N1. Specifically, the digital signal processor 130 may include a DA converter (not shown) for converting a digital signal into an analog signal, and may generate the analog voltage signals AV1 and AV2 by means of the DA converter and output them to the first node N1. More specifically, the digital signal processor 130 may generate the first analog voltage signal AVS1 and output it to the first node N1 at a point in time when the signal generator 120 generates the transmission pulse signal PT1, and may generate the second analog voltage signal AVS2 and output it to the first node N1 at a point in time when the signal generator 120 generates the reception pulse signal PR1. The first analog voltage signal AVS1 is a signal for turning on the transistor TR1 into transmit mode, and the second analog voltage signal AVS2 is a signal for turning on the transistor TR1 into receive mode. The first analog voltage signal AVS1 and the second analog voltage signal AVS2 have different characteristics. When the first analog voltage signal AVS1 is generated, the first analog voltage signal AVS1 is combined at the first node N1 with the pulse signal PT2 that has passed through the impedance element I4. When a combined signal (hereinafter, 'first combined signal') of the first analog voltage signal AVS1 and the pulse signal PT2 is input into the transfer unit 110, the transistor TR1 is turned on into transmit mode based on the characteristics of the first combined signal. When the transistor TR1 is turned on into transmit mode, the first combined signal on the first node N1 is transferred to the antenna AN1 through the impedance element I1, and the UWB signal transferred to the antenna AN1 is transmitted by the antenna AN1. When the second analog voltage signal AVS2 is generated, the second analog voltage signal AVS2 is combined at the first node N1 with the pulse signal PR2 that has passed through the impedance element I5 and the impedance element I6. When a combined signal (hereinafter, 'second combined signal') of the second analog voltage signal AVS2 and the pulse signal PR2 is input into the transfer unit 110, the transistor TR1 is turned on into receive mode based on the characteristics of the second combined signal. When the transistor TR1 is turned on into receive mode, a UWB signal received by the antenna AN1 is transferred to the first node N1 through the impedance element I1, and the signal (hereinafter, 'first received signal') transferred to the first node N1 is transferred to the capacitor C1 through the impedance element I6. The second analog voltage signal AVS2 may include N second analog voltage signals AVS2_1 to AVS2_N corresponding to N scan distances. For instance, if N is 2, the digital signal processor 130 may output the first analog voltage signal AVS1 to the first node N1 and then output the second analog voltage signal AVS2_1 corresponding to the first scan distance (e.g., 0~1 m) to the first node N1. Also, the digital signal processor 130 may output the first analog voltage signal AVS1 again to the first node N1 and then output the second analog voltage signal AVS2_2 corresponding to the second scan distance (e.g., 1~2 m) to the first node N1.

The capacitor C1 is charged by the pulse signal PR2 that has passed through the impedance element I5 and the first received signal that has passed through the impedance element I6. Specifically, one end of the capacitor C1 is grounded, and the other end is connected to a second node N2. The capacitor C1, the impedance element I6, the impedance element I5, and the AD converter 140 may be connected to the second node N2. If there is no signal received by the antenna AN1 (that is, the first received signal does not exist), the capacitor C1 is charged only by the pulse signal PR2 that has passed through the impedance element I5.

The AD converter 140 converts an analog signal into a digital signal. Specifically, the AD converter 140 samples signal components accumulated in the capacitor C1 (a signal in the charged capacitor C1) at a sampling rate of several kilohertz, and outputs the sampled signal to the digital signal processor 130.

The digital signal processor 130 performs digital signal processing on the sampled signal by means of the AD converter 140. The digital signal processor 130 transmits a discharging signal DS1 for discharging the charged capacitor C1 to the AD converter 140. The AD converter 140 discharges the capacitor C1 in response to the discharging signal DS1.

Figure 2:
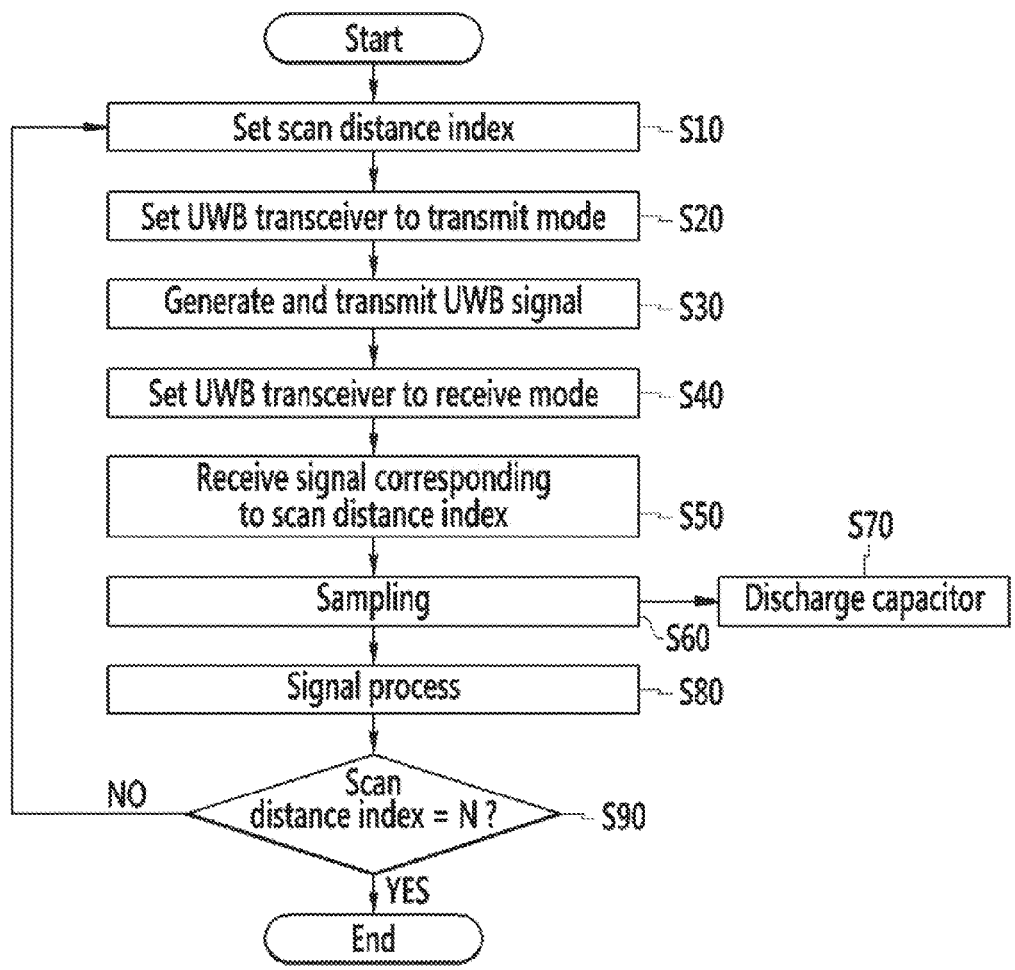
FIG. 2 is a flowchart showing a signal transmission and reception procedure for the UWB transceiver.

FIG. 2 is a flowchart showing a signal transmission and reception procedure for the UWB transceiver 100.

The UWB transceiver 100 sets a scan distance index S10. For ease of explanation, FIG. 2 will be explained on the assumption that the total number (N) of scan distances is 3. The scan distance index may have a value of 1 to 3 corresponding to three scan distances (first scan distance (e.g., 0~1 m), second distance (e.g., 1~2 m), and third scan distance (e.g., 2~3 m). The UWB transceiver 100 sequentially sets the scan distance index to 1 to 3. For instance, the UWB transceiver 100 sets the scan distance index to 1. The UWB transceiver 100 is set to transmit mode (S20). Specifically, the digital signal processor 130 generates a first analog voltage signal AVS1 and outputs it to the first node N1. Then, the signal generator 120 generates a transmission pulse signal PT1 and an on-off control signal ST1 and outputs them to the transmit buffer BF1.

The UWB transceiver 100 generates a UWB signal and transmits it to the outside (S30). Specifically, the transmit buffer BF1 is turned on in response to the on-off control signal ST1. The turned-on transmit buffer BF1 generates a pulse signal PT2 by using the transmission pulse signal PT1 and the on-off control signal ST1 and outputs it to the first node N1. The pulse signal PT2 that has passed through the impedance element I4 is combined at the first node N1 with the first analog voltage signal AVS1, and the first combined signal is input into the transfer unit 110. The first combined signal is transferred to the collector of the transistor TR1 through the impedance element I1, and the first combined signal is also transferred to the base of the transistor TR1 through the impedance element I2 after its voltage is distributed by the voltage distributor 111. The transistor TR1 is turned on into transmit mode. When the transistor TR1 is turned on into transmit mode, the first combined signal on the first node N1 is transferred to the antenna AN1 through the impedance element I1. The signal (UWB signal) transferred to the antenna AN1 is transmitted to the outside.

The UWB transceiver 100 is set to transmit mode (S40). Specifically, the digital signal processor 130 generates a second analog voltage signal AVS2 corresponding to the scan distance index set in the step S10 and outputs it to the first node N1. For example, if the scan distance index is 1, a second analog voltage signal AVS2_1 corresponding to the first scan distance is generated and output to the first node N1. Also, the signal generator 120 generates a reception pulse signal PR1 and on-off control signal SR1 corresponding to the scan distance index set in the step S10 and outputs them to the receive buffer BF2. For instance, if the scan distance index is 1, the signal generator 120 generates a reception pulse signal PR1_1 and an on-off control signal SR1_1 corresponding to the first scan distance and outputs them to the receive buffer BF2.

The UWB transceiver 100 receives a signal (UWB signal) corresponding to the scan distance index set in the step S10 (S50). For instance, if the scan distance index is 1, the receive buffer BF2 is turned on in response to the on-off control signal SR1_1. The turned-on receive buffer BF2 generates a pulse signal PR2 by using the reception pulse signal PR1_1 and the on-off control signal SR1_1 and outputs them to the first node N1. The pulse signal PR2 that has passed through the impedance element I5 is transferred to the capacitor C1. The second analog voltage signal AVS2_1 and the pulse signal PR2 that has passed through the impedance element I5 and the impedance element I5 are combined together at the first node N1, and the second combined signal is input into the transfer unit 110. The second combined signal is transferred to the collector of the transistor TR1 through the impedance element I1, and the second combined signal is also transferred to the base of the transistor TR1 through the impedance element I2 after its voltage is distributed by the voltage distributor 111. The transistor TR1 is turned on into receive mode. When the transistor TR1 is turned on into receive mode, a signal received by the antenna AN1, if any, is transferred to the first node N1 through the impedance element I1. The first received signal (UWB signal) transferred to the first node N1 is transferred to the capacitor C1 through the impedance element I6. If the first received signal exists, the capacitor C1 is charged by the first received signal that has passed through the impedance element I6 and the pulse signal PR2 that has passed through the impedance element I5. If the first received signal does not exist, the capacitor C1 is charged only by the pulse signal PR2 that has passed through the impedance element I5.

The UWB transceiver 100 samples a signal in the charged capacitor C1 (or a signal of the charged capacitor C1) (S60). Specifically, the AD converter 140 samples a signal in the charged capacitor C1 at a sampling rate of several kilohertz, and then outputs it to the digital signal processor 130.

The UWB transceiver 100 processes the sampled signal (S80). Specifically, the digital signal processor 130 performs digital signal processing on the sampled signal. The signal processed in the step S80 may be used for a particular purpose (e.g., object detection).

The UWB transceiver 100 discharges the capacitor C1 (S70). Specifically, the digital signal processor 130 may output a discharging signal DS1 to the AD converter 140 before, during, or after the step S80.

The UWB transceiver 100 determines whether the scan distance index is 3 (S90). If the scan distance index is not 3, the UWB transceiver 100 changes the scan distance index to the next value (S10), and the above-described steps S20 to S80 are repeated.

Figure 3:
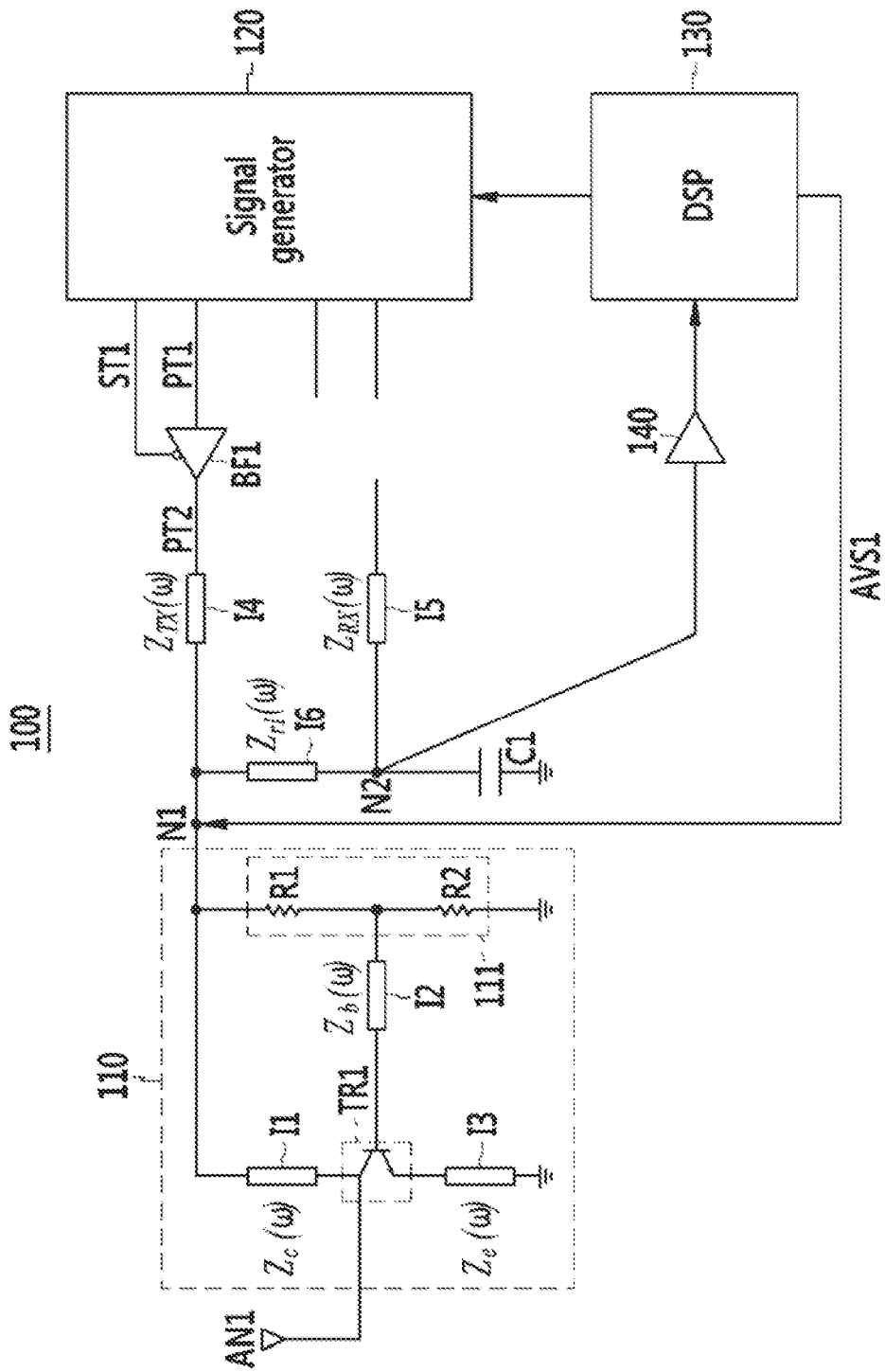
FIG. 3 is a view showing the UWB transceiver in transmit mode.

FIG. 3 is a view showing the UWB transceiver 100 in transmit mode.

As shown in the steps S20 and S30 of FIG. 2, the UWB transceiver 100 is set to transmit mode and transmits a UWB signal to the outside. Specifically, the signal generator 120 of the UWB transceiver 100 turns on the transmit buffer BF1 by the on-off control signal ST1, and turns off the receive buffer BF2 by the on-off control signal SR1. Due to this, the receive chain (e.g., receive buffer BF2) is separated, and the UWB transceiver 100 operates in transmit mode. The digital signal processor 130 of the UWB transceiver 100 outputs a first analog voltage signal AVS1 for transmission to the first node N1 through a DA converter (not shown). A pulse signal PT2 that has passed through the impedance element I4 and the first analog voltage signal AVS1 are combined together at the first node N1. The first combined signal is transferred to the collector of the transistor TR1 through the impedance element I1, and the first combined signal is also transferred to the base of the transistor TR1 through the impedance element I2 after its voltage is distributed by the voltage distributor 111. The transistor TR1 is turned on into transmit mode.

Figure 4:
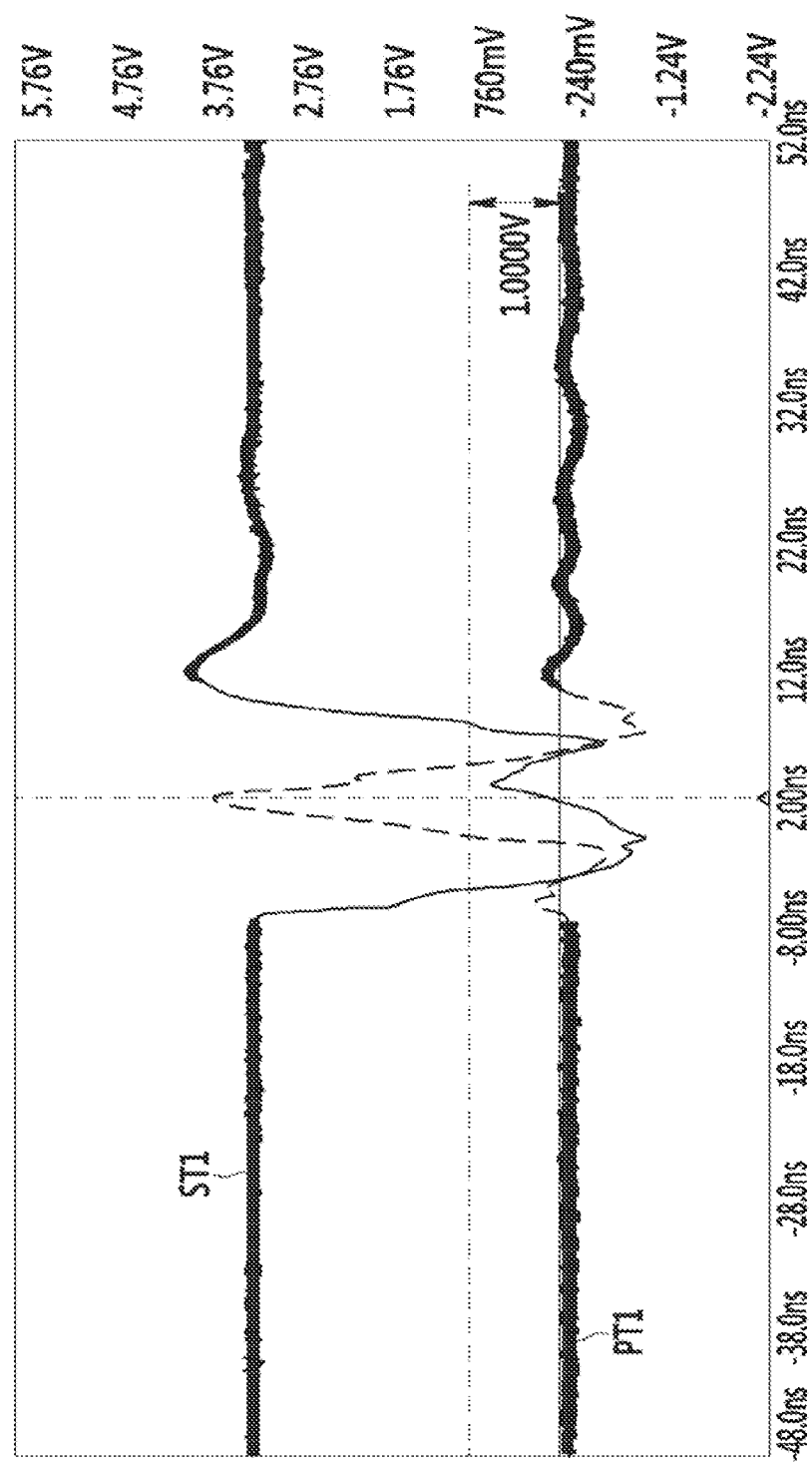
FIG. 4 is a view showing a transmission pulse signal and on-off control signal generated by the UWB transceiver in transmit mode.

FIG. 4 is a view showing a transmission pulse signal PT1 and on-off control signal ST1 generated by the UWB transceiver 100 in transmit mode. Specifically, FIG. 4 is a graph of a transmission pulse signal PT1 and on-off control signal ST1 measured with an oscilloscope. In FIG. 4, the horizontal axis indicates time, and the vertical axis indicates voltage.

As illustrated in FIG. 4, the signal generator 120 outputs a transmission pulse signal PT1 with a pulse width of several nanoseconds (ns) and an on-off control signal ST1 with a pulse width of several nanoseconds (ns) for turning on the transmit buffer BF1. When turned on in response to the on-off control signal ST1, the transmit buffer BF1 generates a pulse signal PT2 with a pulse width of several nanoseconds (ns) and outputs it to the first node N1, by using the transmission pulse signal PT1 and the on-off control signal ST1.

Figure 5:
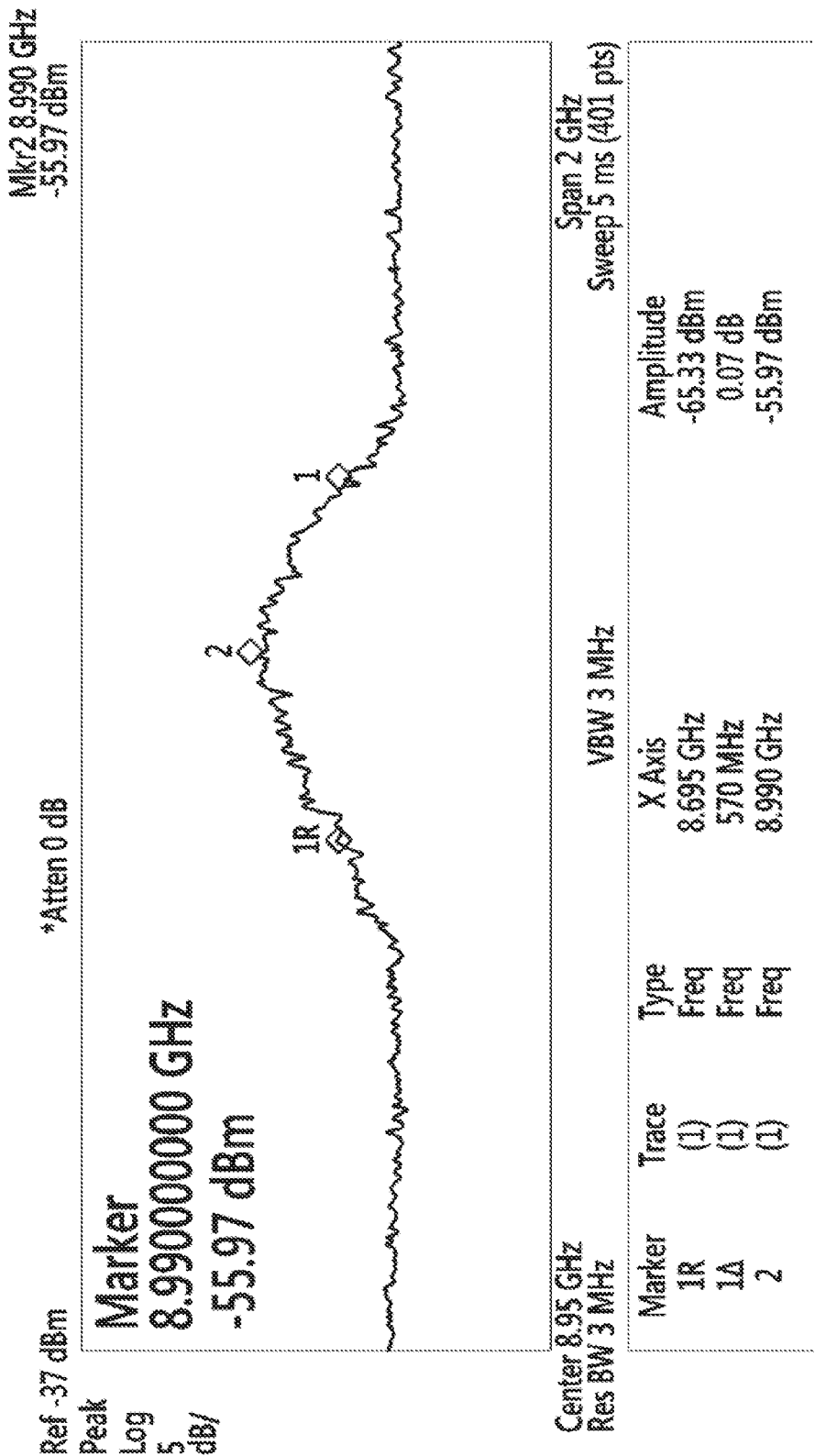
FIG. 5 is a view showing a UWB signal in which the UWB transceiver in transmit mode transmits to the outside by an antenna.

FIG. 5 is a view showing a UWB signal that the UWB transceiver 100 in transmit mode transmits to the outside by the antenna AN1. Specifically, FIG. 5 is a graph of the spectrum of a UWB signal radiated from the antenna AN1 that is measured with an oscilloscope. In FIG. 5, the horizontal axis indicates frequency, and the vertical axis indicates power (dBm) of the UWB signal radiated from the antenna AN1.

When the UWB transceiver 100 operates in transmit mode, a UWB signal generated based on a first analog voltage signal AVS1 and a pulse signal PT2 are transmitted to the outside by the antenna AN1. Specifically, the UWB signal transmitted to the outside is generated based on the voltage applied to the collector of the transistor TR1, the voltage applied to the base of the transistor TR1, and the pulse signal PT2. The spectral characteristics (e.g., center frequency, bandwidth, output, etc.) of the UWB signal transmitted to the outside by the antenna AN1 may be changed by changing the value of the pulse signal PT2, the value of the analog voltage signal AVS1, the impedance values $Z_c(\omega)$, $Z_b(\omega)$, and $Z_e(\omega)$ of the impedance elements I1 to I3, or the voltage distribution ratio of the voltage distributor 111.

Figure 6:
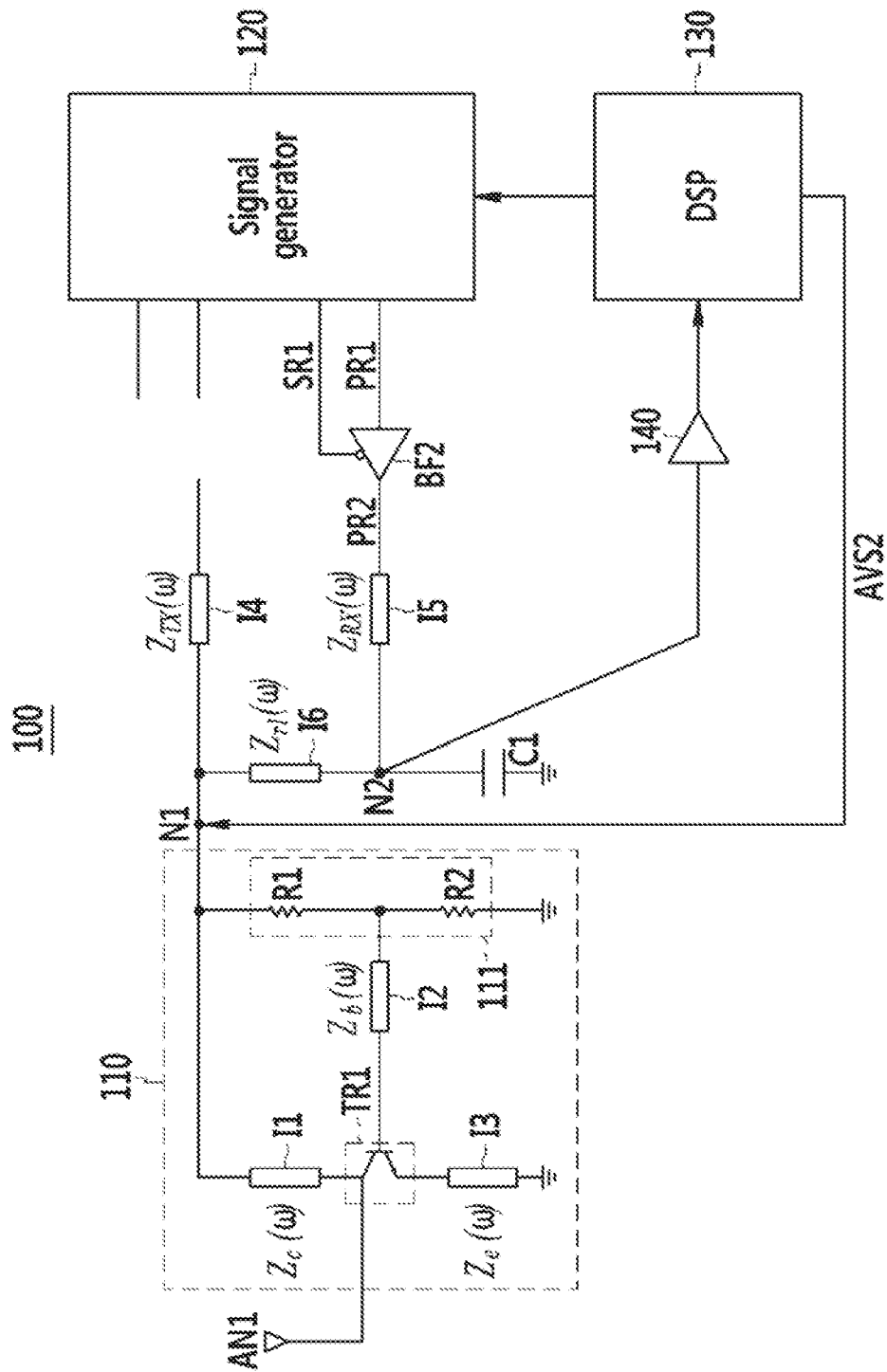
FIG. 6 is a view showing the UWB transceiver in receive mode.

FIG. 6 is a view showing the UWB transceiver 100 in receive mode.

As shown in the steps S40 and S50 of FIG. 2, the UWB transceiver 100 is set to receive mode, and receives a UWB signal from the outside. Specifically, the signal generator 120 of the UWB transceiver 100 turns off the transmit buffer BF1 by the on-off control signal ST1, and turns on the receive buffer BF2 by the on-off control signal SR1. Due to this, the transmit chain (e.g., transmit buffer BF1) is separated, and the UWB transceiver 100 operates in receive mode. The digital signal processor 130 of the UWB transceiver 100 outputs a second analog voltage signal AVS2 for reception to the first node N1 through a DA converter (not shown). A second analog voltage signal AVS2_1 and a pulse signal PR2 that has passed through the impedance element I5 and the impedance element I6 are combined together at the first node N1. The second combined signal is transferred to the collector of the transistor TR1 through the impedance element I1, and the second combined signal is also transferred to the base of the transistor TR1 through the impedance element I2 after its voltage is distributed by the voltage distributor 111. The transistor TR1 is turned on into receive mode.

Figure 7:
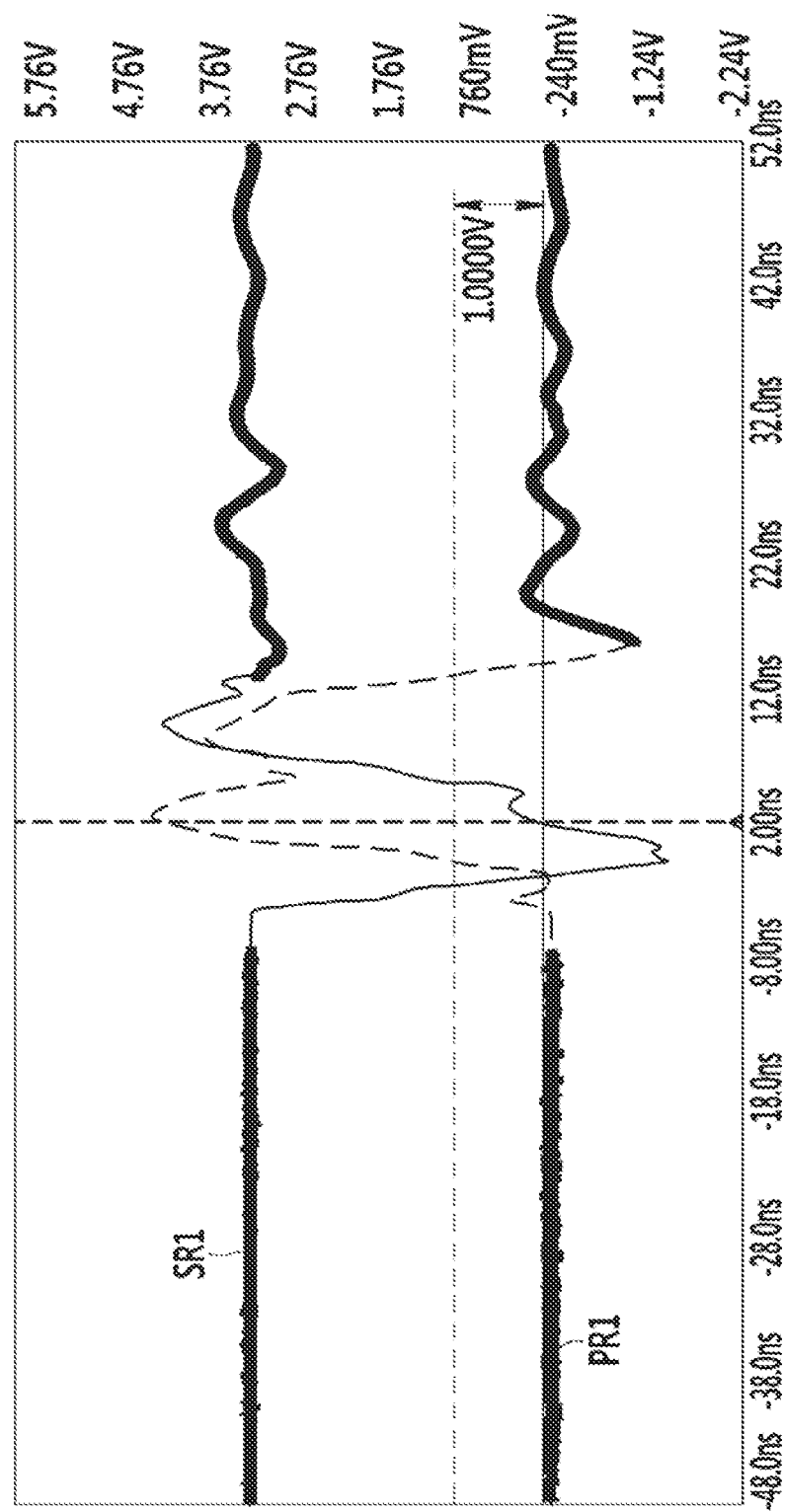
FIG. 7 is a view showing a reception pulse signal and on-off control signal generated by the UWB transceiver in receive mode.

FIG. 7 is a view showing a reception pulse signal PR1 and on-off control signal SR1 generated by the UWB transceiver 100 in receive mode. Specifically, FIG. 7 is a graph of a reception pulse signal PR1 and on-off control signal SR1 measured with an oscilloscope. In FIG. 7, the horizontal axis indicates time, and the vertical axis indicates voltage.

As illustrated in FIG. 7, the signal generator 120 outputs a reception pulse signal PR1 with a pulse width of several nanoseconds (ns) and an on-off control signal SR1 with a pulse width of several nanoseconds (ns) for turning on the receive buffer BF2. The reception pulse signal PR1 is a signal for receiving discrete signals depending on the scan distance. A reception pulse signal PR1 is required to scan a distance, and a plurality of reception pulse signals PR1 (e.g., PR1_1 to PR1_N) are required to scan a plurality of distances. When turned on in response to the on-off control signal SR1, the receive buffer BF2 generates and outputs a pulse signal PR2 with a pulse width of several nanoseconds (ns) by using the reception pulse signal PR1 and the on-off control signal SR1.

The UWB transceiver 10 operates in receive mode based on the second analog voltage signal AVS2 and the pulse signal PR2. Specifically, the UWB transceiver 100 operates in receive mode based on the voltage applied to the collector of the transistor TR1, the voltage applied to the base of the transistor TR1, and the pulse signal PR2.

Figure 8:
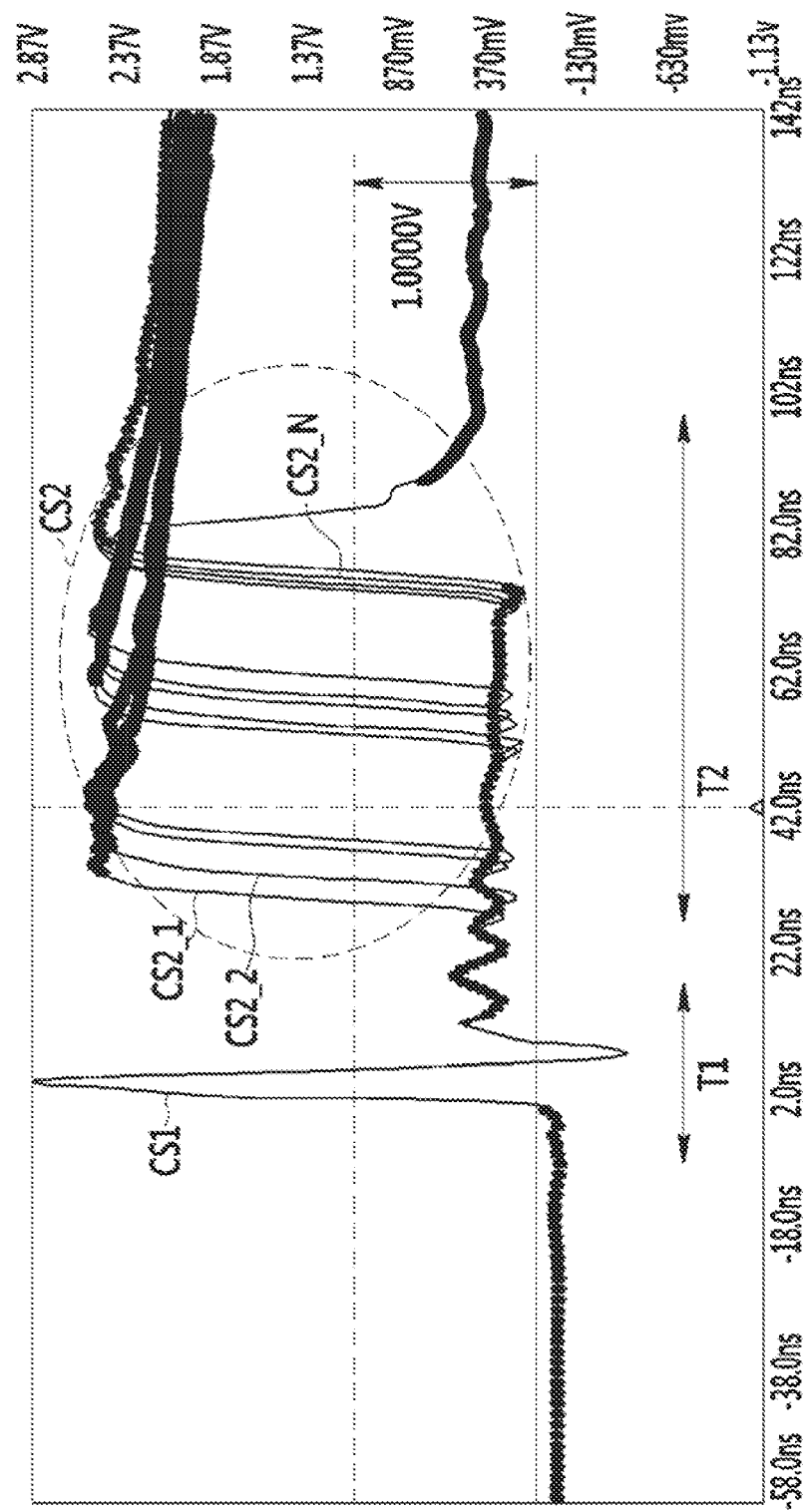
FIG. 8 is a view showing a first combined signal and a second combined signal that are on the first node.

FIG. 8 is a view showing a first combined signal CS1 and a second combined signal CS2 that are on the first node N1.

Specifically, FIG. 8 is a graph of a first combined signal CS1 and N second combined signals CS2_1 to CS2_N for scanning discrete signals corresponding to N distances that are measured with an oscilloscope. In FIG. 8, the horizontal axis indicates time, and the vertical axis indicates voltage.

In the graph of FIG. 8, the wave in the period T1 represents the first combined signal CS1, and the N waves in the period T2 represent N second combined signals CS2_1 to CS2_N. FIG. 8 illustrates N second combined signals CS2_1 to CS2_N as if they were generated following the generation of a first combined signal CS1, but actually a second combined signal CS2 is generated following the generation of a first combined signal CS1, the first combined signal CS1 is generated again, and then the next second combined signal CS2 is generated. For example, if the number (N) of scan distances is 3, a first combined signal CS1 is generated and then a second combined signal CS2_1 corresponding to the first scan distance is generated. Next, the first combined signal CS1 is generated again, and then a second combined signal CS2_2 corresponding to the second scan distance is generated. Next, the first combined signal CS1 is generated again, and then a second combined signal CS2_3 corresponding to the third scan distance is generated.

The characteristics of the first combined signal CS1, second combined signal CS2, UWB signal transmitted to the outside, first received signal, or signal transferred to the capacitor C1 may be determined based on the impedance values $Z_c(\omega)$, $Z_b(\omega)$, $Z_e(\omega)$, $Z_{TX}(\omega)$, $Z_{RX}(\omega)$, and $Z_{r1}(\omega)$ of the impedance elements I1 to I6.

Figure 9:
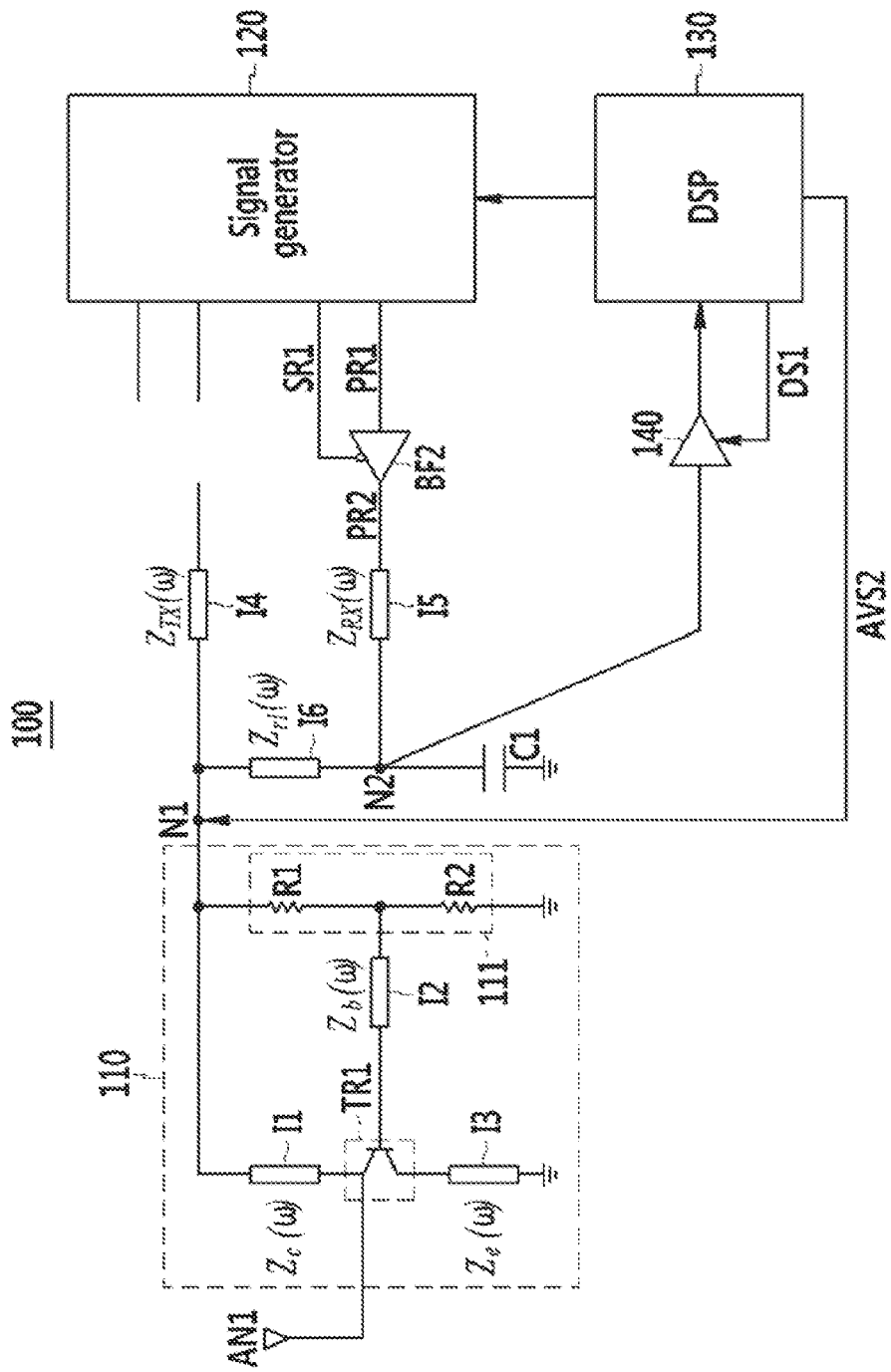
FIG. 9 is a view showing the UWB transceiver that performs a sampling operation.

FIG. 9 is a view showing the UWB transceiver 100 that performs a sampling operation.

As shown in the steps S60 to S80 of FIG. 2, the UWB transceiver 100 samples a signal in the charged capacitor C1, processes the sampled signal, and discharges the capacitor C1. Specifically, if there exists a signal received by the antenna AN1 (a first received signal exists), the capacitor C1 is charged by the first received signal that has passed through the impedance element I6 and a pulse signal PR2 that has passed through the impedance element I5. On the other hand, if there is no signal received by the antenna AN1 (the first received signal does not exist), the capacitor C1 is charged only by the pulse signal PR2 that has passed through the impedance element I5. The AD converter 140 samples a signal in the charged capacitor C1 at a sampling rate of several kilohertz, and outputs the sampled signal to the digital signal processor 130. The digital signal processor 130 processes the sampled signal. The digital signal processor 130 transmits a discharging signal DS1 to the AD converter 140, and the AD converter 140 discharges the capacitor C1 in response to the discharging signal DS1.

Figure 10:
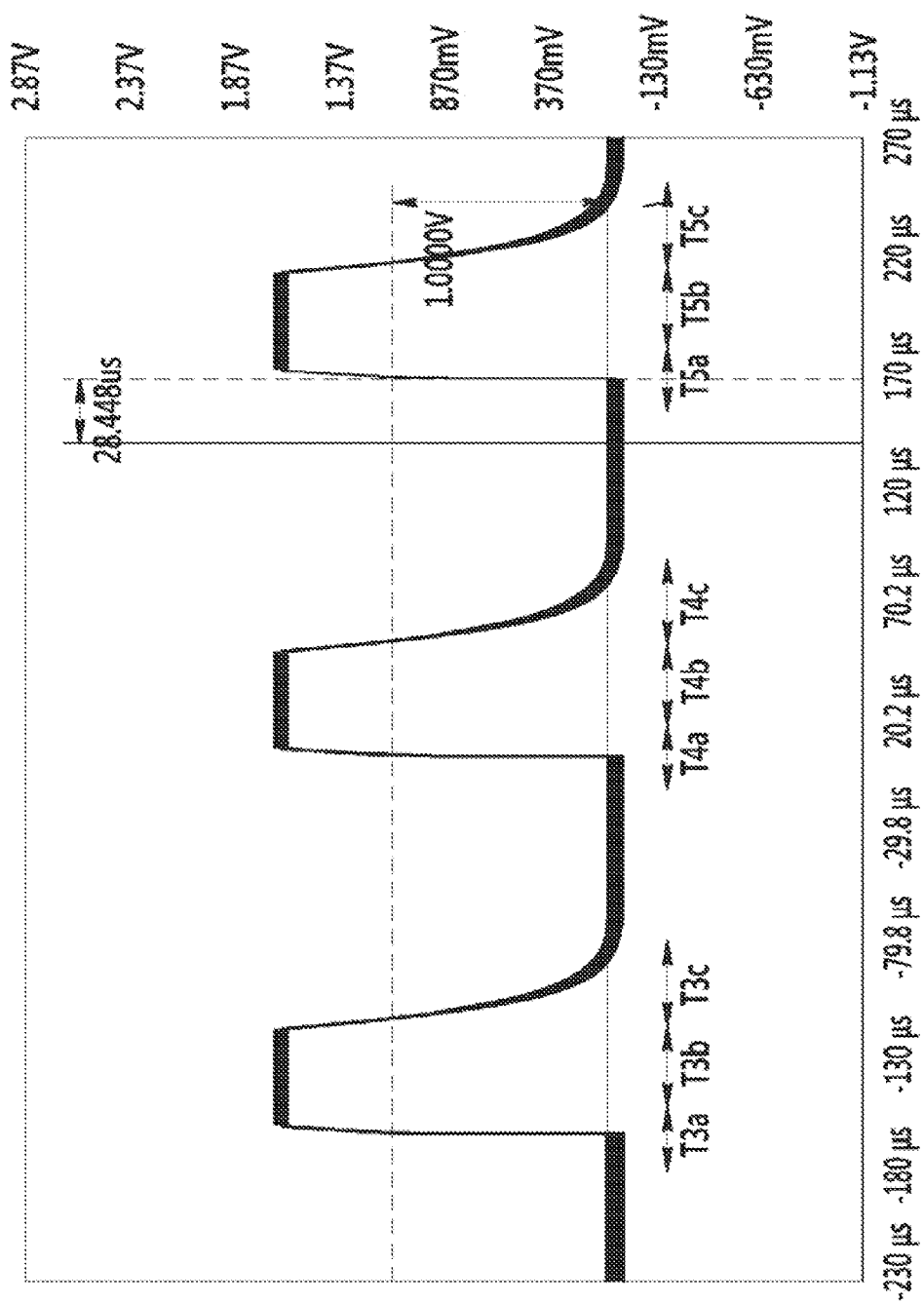
FIG. 10 is a view showing capacitor charging periods, sampling periods, and capacitor discharging periods.

FIG. 10 is a view showing capacitor C1 charging periods T3a, T4a, and T5a, sampling periods T3b, T4b, and T5b, and capacitor C1 discharging periods T3c, T4c, and T5c. Specifically, FIG. 10 is a graph of the voltage of the capacitor C1 measured with an oscilloscope. In FIG. 10, the horizontal axis indicates time, and the vertical axis indicates voltage.

In FIG. 10, the periods T3a to T3c correspond to the first scan distance out of N scan distances, the periods T4a to T4c correspond to the second distance out of the N scan distances, and the periods T5a to T5c correspond to the third scan distance out of the N scan distances.

After the capacitor C1 is charged in the periods T3a, T4a, and T5a, the AD converter 140 samples a signal in the capacitor C1 in the periods T3b, T4b, and T5b. Then, the AD converter 140 discharges the capacitor C1 in the periods T3c, T4c, and T5c in response to a discharging signal DS1 from the digital signal processor 130.

Figure 11:
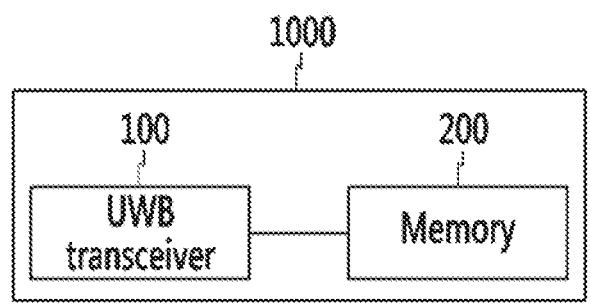
FIG. 11 is a view showing a UWB radar sensor according to an exemplary embodiment of the present invention.

FIG. 11 is a view showing a UWB radar sensor 1000 according to an exemplary embodiment of the present invention.

The UWB radar sensor 1000 detects the presence or absence of an object and the distance to the object by using a signal that returns after transmitting a UWB signal to the outside.

Specifically, the UWB radar sensor 1000 may include the above-described UWB transceiver 100 and a memory 200 connected to the UWB transceiver 100.

The memory 200 stores various information relating to the operation of the UWB transceiver 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An ultra-wideband transceiver comprising:
    one antenna for transmitting a first ultra-wideband signal at time 1 and receiving a second ultra-wideband signal at time 2;
    a transfer unit that transfers the first ultra-wideband signal from a first node to the antenna in transmit mode or transfers the second ultra-wideband signal received by the antenna to the first node in receive mode; and
    a first buffer that generates a first pulse signal for the first ultra-wideband signal and outputs the same to the first node at time 1,
    wherein a first input signal input into the transfer unit at time 1 is a signal obtained by combining the first pulse signal and a first analog voltage signal at the first node;
    a second buffer that generates and outputs a second pulse signal for receiving the second ultra-wideband signal at time 2,
    wherein a second input signal input into the transfer unit at time 2 is a signal obtained by combining the second pulse signal and a second analog voltage signal, and
    wherein the second pulse signal comprises a plurality of pulse signals corresponding to respective scan distances, and the second analog voltage signal comprises a plurality of voltage signals respectively corresponding to the scan distances.

2. The ultra-wideband transceiver of claim 1, wherein the transfer unit comprises:
    one transistor connected to the antenna; and
    a voltage distributor for distributing the voltage of the first node,
    the transistor comprising:
    a collector that is connected to a first impedance element connected to the first node and is connected to the antenna;
    a base that is connected to a second impedance element connected to the voltage distributor; and
    an emitter that is connected to a grounded third impedance element.

3. The ultra-wideband transceiver of claim 1, further comprising a signal generator that outputs a transmission pulse signal and a first turn-on signal for turning on the first buffer to the first buffer and outputs a plurality of reception pulse signals and a second turn-on signal for turning on the second buffer to the second buffer, the plurality of reception pulse signals respectively corresponding to the scan distances,
    wherein, when turned on in response to the first turn-on signal, the first buffer generates the first pulse signal with a nanosecond (ns) pulse width by using the transmission pulse signal and the first turn-on signal, and
    when turned on in response to the second turn-on signal, the second buffer generates the second pulse signal by using the reception pulse signals and the second turn-on signal.

4. The ultra-wideband transceiver of claim 3, wherein
the signal generator outputs a first reception pulse signal of the plurality of reception pulse signals after outputting the transmission pulse signal, outputs the transmission pulse signal after outputting the first reception pulse signal, and outputs a second reception pulse signal of the plurality of reception pulse signals after outputting the transmission pulse signal.

5. The ultra-wideband transceiver of claim 4, further comprising a digital signal processor that outputs the first analog voltage signal to the first node at time 1 and outputs the second analog voltage signal to the first node at time 2.

6. The ultra-wideband transceiver of claim 5, further comprising:
a capacitor that is charged by the second ultra-wideband signal and the second pulse signal at time 2; and
a first converter that samples a signal in the charged capacitor at a kilohertz sampling rate and outputs the sampled signal to the digital signal processor.

7. The ultra-wideband transceiver of claim 6, wherein
the digital signal processor processes the sampled signal and transmits a discharging signal for discharging the charged capacitor to the first converter, and
the signal generator outputs the transmission pulse signal again after the discharging of the capacitor and outputs the second reception pulse signal after outputting the transmission pulse signal.

8. The ultra-wideband transceiver of claim 6, wherein
the first pulse signal is transferred to the first node through a first impedance element,
the second pulse signal is transferred through a second impedance element to a second node connected to one end of the capacitor, and
the second ultra-wideband signal is transferred to the second node at time 2 through a third impedance element with one end connected to the first node and the other end connected to the second node.

9. The ultra-wideband transceiver of claim 2, wherein
the voltage distributor comprises a first resistor with one end connected to the first node and the other end connected to the second impedance element, and a second resistor with one end connected to the second impedance element and the other end grounded, and
the characteristics of the first ultra-wideband signal are determined based on the impedance values of the first impedance element and the third impedance element.

10. A method for an ultra-wideband transceiver to transmit a first ultra-wideband signal and receive a second ultra-wideband signal, the method comprising:
generating a first pulse signal for the first ultra-wideband signal and a first analog voltage signal;
turning on one transistor into transmit mode by using a first combined signal that is a signal obtained by combining the first pulse signal and the first analog voltage signal at a first node;
transferring the first ultra-wideband signal corresponding to the first combined signal to one antenna through the transistor turned on into transmit mode, and transmitting the first ultra-wideband signal by the antenna;
generating a second pulse signal for receiving the second ultra-wideband signal and a second analog voltage signal, different from the first analog voltage signal, wherein the second pulse signal comprises a plurality of pulse signals corresponding to respective scan distances, and the second analog voltage signal comprises a plurality of voltage signals respectively corresponding to the scan distances;
turning on the transistor into receive mode by using a second combined signal that is a signal obtained by combining the second pulse signal and the second analog voltage signal at the first node; and
transferring the second ultra-wideband signal received by the antenna to a capacitor through the transistor turned on into receive mode.

11. The method of claim 10, wherein
the turning on of the transistor into transmit mode comprises:
transferring the first combined signal to a collector of the transistor through a first impedance element; and
distributing voltage of the first combined signal and transferring the distributed signal to a base of the transistor through a second impedance element,
wherein the collector of the transistor is connected to the antenna, and
an emitter of the transistor is connected to a grounded third impedance element.

12. The method of claim 11, wherein
the generating of the first pulse signal and the first analog voltage signal comprises generating the first pulse signal with a nanosecond (ns) pulse width by using a transmission pulse signal and a turn-on signal for turning on a transmit buffer,
wherein the characteristics of the first ultra-wideband signal are determined based on the impedance values of the first impedance element and third impedance element.

13. The method of claim 10, wherein the generating of the second pulse signal and the second analog voltage signal comprises:
after transmitting the first ultra-wideband signal, generating one of the plurality of pulse signals belonging to the second pulse signal by using a first reception pulse signal corresponding to a first scan distance and a first turn-on signal for turning on a receive buffer; and
generating one corresponding to the first scan distance of the plurality of voltage signals belonging to the second analog voltage signal.

14. The method of claim 13, wherein the turning on of the transistor into receive mode comprises:
transferring the second combined signal through a first impedance element to a collector of the transistor connected to the antenna; and
distributing voltage of the second combined signal and transferring the distributed signal to a base of the transistor through a second impedance element,
wherein an emitter of the transistor is connected to a grounded third impedance element.

15. The method of claim 14, further comprising:
charging the capacitor by using the second ultra-wideband signal and the second pulse signal; and
sampling a signal in the charged capacitor at a kilohertz sampling rate,
wherein the transferring of the second ultra-wideband signal to the capacitor comprises, when the transistor is turned on into receiver mode, transferring the second ultra-wideband signal to the capacitor with the other end grounded, through the first impedance element and a fourth impedance element connected to one end of the capacitor.

16. The method of claim 15, further comprising:
discharging the charged capacitor;
turning on the transistor into transmit mode by using the first combined signal and transferring the first ultra-wideband signal to the antenna; and re-transmitting the first ultra-wideband signal transferred to the antenna by the antenna.

17. An ultra-wideband radar sensor that detects an object by using a second ultra-wideband signal that returns after transmitting a first ultra-wideband signal, the ultra-wideband radar sensor comprising:
a memory; and
an ultra-wideband transceiver that is connected to the memory and transmits the first ultra-wideband signal and receives the second ultra-wideband signal,
the ultra-wideband transceiver comprising:
one antenna for transmitting the first ultra-wideband signal at time 1 and receiving the second ultra-wideband signal at time 2;
a transfer unit that transfers the first ultra-wideband signal from a first node to the antenna or transfers the second ultra-wideband signal received by the antenna to the first node, based on characteristics of an input signal;
a first buffer that generates a first pulse signal for the first ultra-wideband signal and outputs the same to the first node at time 1,
wherein a first input signal input into the transfer unit at time 1 is a signal obtained by combining the first pulse signal and a first analog voltage signal at the first node; and
a second buffer that generates and outputs a second pulse signal for receiving the second ultra-wideband signal at time 2,
wherein a second input signal input into the transfer unit at time 2 is a signal obtained by combining the second pulse signal and a second analog voltage signal at the first node, and
wherein the second pulse signal comprises a plurality of pulse signals corresponding to respective scan distances, and the second analog voltage signal comprises a plurality of voltage signals respectively corresponding to the scan distances.

18. The ultra-wideband radar sensor of claim 17, wherein the transfer unit comprises one transistor connected to the antenna and a voltage distributor for distributing voltage of the first node,
the transistor comprising:
a collector that is connected to a first impedance element connected to the first node and is connected to the antenna;
a base that is connected to a second impedance connected to the voltage distributor; and
an emitter that is connected to a grounded third impedance element.

* * * * *